United States Patent [19]

Muromura et al.

[11] Patent Number: 5,464,571
[45] Date of Patent: Nov. 7, 1995

[54] ONCE-THROUGH NUCLEAR REACTOR FUEL COMPOUNDS

[75] Inventors: Tadasumi Muromura; Hideki Takano; Hiroshi Akie; Shojiro Matsuura, all of Ibaraki, Japan

[73] Assignee: Japan Atomic Energy Research Institute, Tokyo, Japan

[21] Appl. No.: 207,639

[22] Filed: Mar. 9, 1994

[30] Foreign Application Priority Data

Jul. 9, 1993 [JP] Japan ..................... 5-170579

[51] Int. Cl.$^6$ ............................. C09K 11/04; G21G 4/00
[52] U.S. Cl. ..................... 252/638; 252/643; 423/251; 423/261
[58] Field of Search ..................... 252/638, 643; 423/251, 261

[56] References Cited

U.S. PATENT DOCUMENTS

| | | | |
|---|---|---|---|
| 3,607,107 | 9/1971 | Ayers | 23/272.5 |
| 3,663,182 | 5/1972 | Hamling | 23/355 |
| 3,981,960 | 9/1976 | Brambilla et al. | 423/5 |
| 4,159,308 | 6/1979 | McLaughlin | 423/20 |
| 4,274,976 | 6/1981 | Ringwood | 252/301.1 W |
| 4,364,859 | 12/1982 | Ohtsuka et al. | 252/643 |
| 4,434,137 | 2/1984 | Stoll et al. | 423/6 |
| 4,571,315 | 2/1986 | Gerontopoulos et al. | 264/0.5 |
| 4,687,601 | 8/1987 | Bachelard et al. | 252/638 |
| 4,971,753 | 11/1990 | Taylor, Jr. et al. | 376/417 |
| 5,180,527 | 1/1993 | Hirai et al. | 252/638 |

OTHER PUBLICATIONS

Proceedings of the International Conference and Technology Exposition on *Future Nuclear Systems: Energing Fuel Cycles and Waste Disposal Options Global*, Seattle, Wa., Sep. 12–17, 1993.
T. Muromura, *Nuclear Waste Ceramics with High Zirconia and Alumina Contents*, 1987, pp. 265–289.
*Weapons Plutonium Burn*, pp. 1195–1225.
*Fission Options to Dispose of Weapons Plutonium*, pp. 805–865.

*Primary Examiner*—Donald P. Walsh
*Assistant Examiner*—Meena Chelliah
*Attorney, Agent, or Firm*—Banner & Allegretti, Ltd.

[57] ABSTRACT

The improved oxide, once-through plutonium fuel compound that can be used for nuclear fission in currently operating light-water reactors and fast reactors has a composition in the range defined by the lines that connect the three compositional points of a three-component system consisting of plutonium dioxide ($PuO_2$), a plutonium host phase and alumina ($Al_2O_3$). The compound also has such a phase structure that two phases, the plutonium host phase having plutonium dioxide dissolved therein and the alumina phase, are in equilibrium.

1 Claim, 1 Drawing Sheet

ONCE-THROUGH NUCLEAR REACTOR FUEL COMPOUNDS

BACKGROUND OF THE INVENTION

This invention relates to compounds that can be used as nuclear reactor fuels. More particularly, it relates to oxide, once-through plutonium Fuel compounds that can be used for nuclear Fission in currently operating light-water reactors and fast reactors.

The nuclear fuel compounds that are used in currently operating light-water reactors and Fast reactors are uranium dioxide ($UO_2$), gadolinia ($Gd_2O_3$) doped uranium dioxide, and mixed uranium and plutonium dioxide ($(U,Pu)O_2$). These nuclear Fuel compounds are pressed into pellets and enclosed in metal cladding, which is made of either a zirconium alloy in light-water reactors or stainless steel in fast reactors. The thus manufactured fuel assembly is used in a nuclear reactor, where it is irradiated with neutrons and part of the uranium and plutonium in the fuel compounds undergoes fission to produce a group of elements that are called "fission products" (FP). The resulting thermal energy is used for electric power generation.

The proportion by which uranium and plutonium in a fuel compound undergoes nuclear fission is called "burnup" and expressed in percent (%). Burnup, which is determined primarily by the operating conditions of a nuclear reactor and the stability of fuel cladding, is in the range from 3 to 5%. In other words, 3–5% of the uranium and plutonium in the fuel compound undergoes nuclear fission. The spent nuclear fuel is dissolved in acid, and the uranium and plutonium which are useful as fuels are separated from fission products. The procedure involving these steps is called "reprocessing". The separated uranium and plutonium are re-converted to a nuclear fuel compound for another use. The fission products are melted in glass and subsequently solidified (vitrified). The solid glass, which is referred to as a high-level radioactive waste, is buried in a deep geological formation. Since the flows of uranium and plutonium form a cycle, the materials flow described above is conventionally referred to as "a nuclear fuel cycle".

With the constant pressure for nuclear disarmament added to the production of plutonium in the nuclear fuel cycle, the excess amount of plutonium has been a global problem and efforts are being made in various countries of the world to develop effective methods that permit plutonium to be used or processed at sites other light-water reactors and fast reactors. The proposals made to date are classified to fall within one of the following two categories (W. J. Broad, Inter. Herald Tribune, Apr. 7, 1993):

(1) Use as a fuel in a new type of reactor

A helium-cooled reactor is newly developed so that it can be operated with plutonium used as a fuel. The problem with this idea is that huge amounts of expenditure and time are necessary to develop the new type of reactor.

(2) Disposal after vitrification

Excess plutonium is simply converted to waste without further use. The processing cost is smaller than in the case of developing the first method; however, from the viewpoint of nuclear fuel cycle which aims at effective utilization of plutonium, the loss of resources is extremely great and, furthermore, the long-term stability of the solid glass is also an important consideration since it has solidified after incorporating a large amount of molten plutonium.

SUMMARY OF THE INVENTION

An object, therefore, of the present invention is to provide a new plutonium fuel compound that is free from the problems with the utilization and processing methods that have heretofore been developed with a view to reducing the amount of excess plutonium, i.e., (1) that can be developed at low cost and (2) that obviates the need for special waste management, thereby causing only a small impact on the existing nuclear fuel cycle.

A further object of the present invention is to provide a new plutonium fuel compound of a once-through type that has the following characteristics:

(1) with the currently operating nuclear facilities being used as such, the new fuel compound undergoes substantially complete nuclear fission in a light-water reactor or fast reactor for electric power generation; and (2) the spent fuel compound need not be reprocessed or solidified but can be directly handled as a high-level waste.

DETAILED DESCRIPTION OF THE INVENTION

Figure 1:
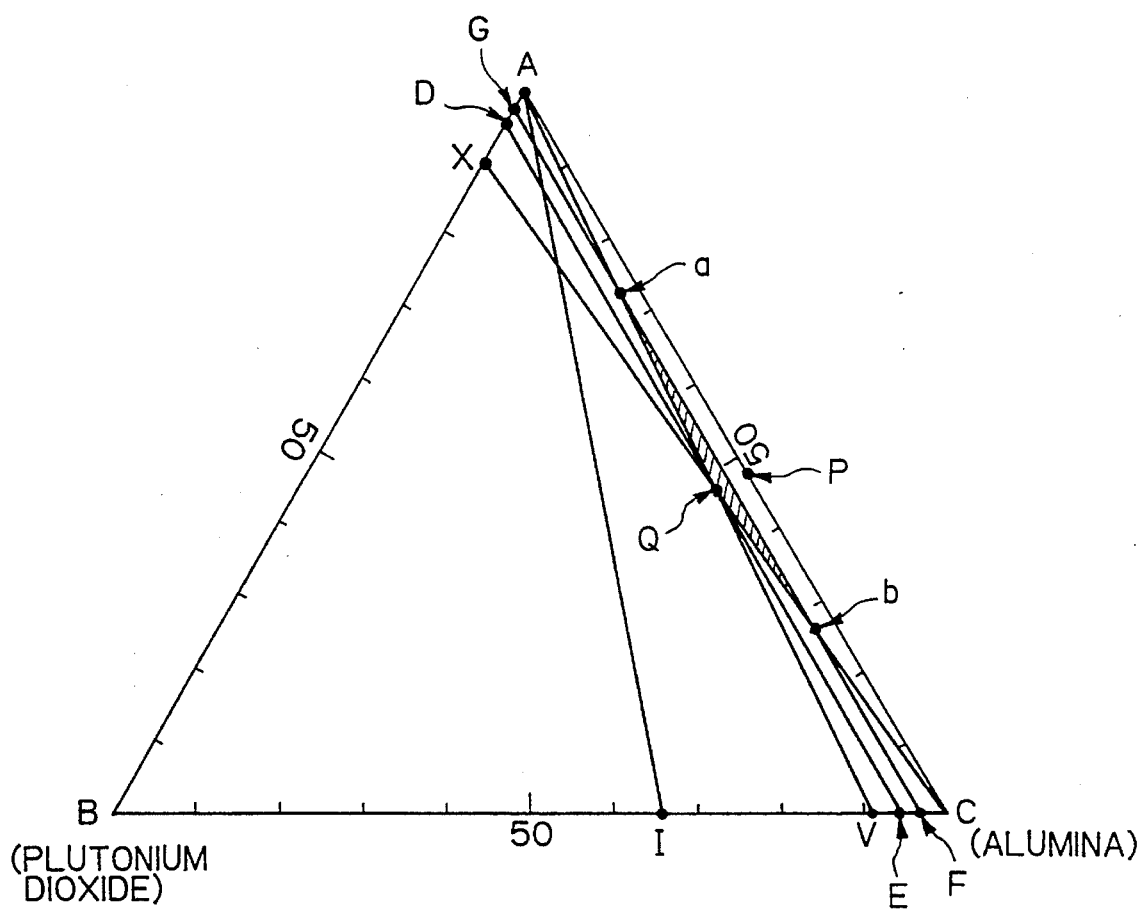
FIG. 1 is a diagram showing the equilibria of a three-component system consisting of plutonium dioxide, a plutonium host phase and alumina, as well as the compositional range (in mol %) for the occurrence of a plutonium fuel compound.

The plutonium fuel compound of the present invention has the following advantages:

(1) it can be manufactured by means of the technology currently employed to fabricate oxide fuels:

(2) since it can be used in currently operating light-water reactors or fast reactors for electric power generation, the huge amounts of expenditure and time that would otherwise be required to develop a new type of reactor can be reduced; and (3) its composition and phase structure are adjusted in such a way as to eliminate the need for reprocessing or solidification of spent fuels and, hence, the compound can be managed as a high-level radioactive waste as it is enclosed in metal cladding. Since the high-level radioactive waste is expected to be so chemically stable and resisting to weathering that it can solve all the problems associated with the methods so far proposed for volume reduction of excess plutonium.

A further advantage of the fuel compound of the present invention is that It does not interfere with the efforts currently made in various parts of the world to recycle nuclear fuels and that therefore it can be used in harmony with the currently employed nuclear fuels.

Having these advantages, the plutonium fuel compound of the present invention must satisfy the following three fuel conditions in terms of composition and phase structure.

Fuel condition 1: The fuel compound under consideration should be an oxide system that is either a single-phase compound capable of becoming a plutonium host phase with 35 mol % of plutonium being dissolved or a multi-phase equilibrium compound in which a plutonium host phase can exist in a thermodynamically stable manner;

Fuel condition 2: The behavior of the plutonium host phase in the process of nuclear fission and the behavior to irradiation should be capable of being estimated and evaluated from the heretofore accumulated technical database; and Fuel condition 3: The fission products in the spent fuel compound should react with other components to produce stable high-level radioactive wastes without any special processing.

The present inventor conducted extensive studies on the changes in the physical and chemical properties of oxide nuclear fuels that would take place in light-water reactors and fast reactors during nuclear fission, as well as on the stable product of solidification of high-level radioactive wastes, and the made comparative review on the thermodynamic properties and the like of various compounds. As a result, the inventor has found that both (1) a plutonium dioxide-thoria-alumina system and (2) a plutonium dioxide-stabilized zirconia-alumina system satisfy the three fuel conditions set forth in the preceding paragraph. The two systems are individually described below in detail.

(1) Plutonium dioxide-thoria-alumina system

The compound of this system contains three compounds, plutonium dioxide ($PuO_2$), thoria ($ThO_2$) and alumina ($Al_2O_3$), and is characterized by two phase at equilibrium, i.e., a phase with a fluorite type structure which is a solid solution of plutonium dioxide and thoria and an alumina phase. In this compound system, thoria having a fluorite type structure phase provides a plutonium host phase, whereby fuel condition i is satisfied.

The plutonium host phase has a crystalline structure of the same fluorite type as conventional fuels and, hence, the physicochemical changes that occur upon irradiation can be estimated and evaluated from the technical database on conventional fuels, whereby fuel condition 2 is satisfied.

The plutonium host phase does not react with alumina ($Al_2O_3$). On the other hand, alumina reacts with fission products such as alkali metal elements and alkaline earth metal elements that can dissolve in limited amounts in the plutonium host phase, thereby forming stable compound. This satisfies fuel condition 3.

(2) Plutonium dioxide-stabilized zirconia-alumina system

The compound of this system contains three compounds, plutonium dioxide ($PuO_2$), stabilized zirconia and alumina ($Al_2O_3$), and is characterized by two phases at equilibrium, i.e., a phase with a fluorite type structure which is a solid solution of plutonium dioxide and stabilized zirconia and an alumina phase. In this compound system, stabilized zirconia having a fluorite type structural phase provides a plutonium host phase. This satisfies fuel condition 1.

The plutonium host phase has a crystalline structure of the same fluorite type as conventional fuels and, hence, the physicochemical changes that occur upon irradiation can be estimated and evaluated from the technical database on conventional fuels. This satisfies Fuel condition 2.

The plutonium host phase does not react with alumina ($Al_2O_3$). On the other hand, alumina reacts with fission products such as alkali metal elements and alkaline earth metal elements that can dissolve in limited amounts in the plutonium host phase, thereby forming stable compounds. This satisfies fuel condition 3.

The plutonium fuel compound of the present invention has either thoria ($ThO_2$) or stabilized zirconia, both with a fluorite type structural phase, present as a plutonium host phase and two phases, the plutonium host phase and an alumina phase ($Al_2O_3$), are in equilibrium. The characteristic utility of the compound is two-fold: (A) it is stable, both physically and chemically, as a fuel; (B) when spent, the compound is already stable as a high-level radioactive waste.

(A) Physical and chemical stability as fuel

The stability of the plutonium fuel compound of the present invention in a nuclear reactor may be considered in the following two aspects: the radiation stability of the plutonium host phase having plutonium dissolved therein; and the solubility of fission products in the plutonium host phase.

The plutonium host phase has a fluorite type structure and is well known to have high stability to radiations. It is also known that the plutonium host phase is highly capable of dissolving various elements, in particular, zirconium, rare earth elements, alkaline earth metal elements, etc. which account for at least 404 of the fission products.

Hence, one may safely assume that the plutonium fuel compound has not only high radiation resistance but also great ability to dissolve fission products.

(B) Stability as high-level radioactive waste

The plutonium fuel compound of the present invention, once it has been spent, has the following four phases at equilibrium. The properties and stability features of the respective phases are described below.

(1) Plutonium host phase

This phase contains thoria ($ThO_2$) or stabilized zirconia as a main component, with plutonium having being extinguished during fission. Fission products that can be dissolved in this host phase include zirconium, rare earth element (cerium, neodymium. etc.) and some alkaline earth metal elements (strontium and barium).

Both thoria ($ThO_2$) and stabilized zirconia are well known to be two of the most chemically stable ceramics. Hence, they are assumed to retain the high resistance to weathering, water, etc. even if they have the above-mentioned fission products dissolved in small amounts.

(2) Magnetoplumbite type phase

Fission products, in particular, alkali metal elements (cesium and rubidium) and alkaline earth metal elements (strontium and barium) will react with alumina in the plutonium fuel compound of the present invention to form magnetoplumbite type phases (e.g., $SrO.6Al_2O_3$).

The magnetoplumbite type phases have the same crystalline structure as natural stable hibonite ($CaO.6Al_2O_3$) and one may well assume that they have high resistance to weathering, water, etc.

(3) Alloy phase

The interior of the fuel cladding for enclosing the plutonium fuel compound of the present invention is filled with a low-oxygen potential atmosphere as in the case of currently used fuels. Hence, certain fission products (e.g., molybdenum, ruthenium, palladium and rhodium) are reduced to the metallic form, thereby forming alloy phases.

The alloy phases are so-called "noble metal alloys" and their chemical stability is well known. Alloy phases of the same type are also generated in currently employed fuels and are known to be slightly soluble in acids.

(4) Alumina phase

The plutonium fuel compound of the present invention has alumina added desirably in an excess amount so as to promote the progress of the formation of magnetoplumbite type phases and its composition is adjusted accordingly.

Hence, in the spent fuel at least 80% of alumina remains unreacted.

It is widely known that like thoria and stabilized zirconia, alumina is one of the most chemically stable ceramics.

Therefore, the high-level radioactive waste in which the four phases (1)–(4) are in equilibrium is composed not only of compounds similar to the natural rocks and ores that can remain stable over several million years but also of chemically stable ceramics. In addition, compounds of a similar phase structure have already been shown to exhibit high water resistance. Hence, the high-level radioactive waste under consideration is also anticipated to display satisfactory resistance to weathering, water, etc. (see T. Muromura, "The Geological Disposal of High Level Radioactive Wastes", (Ed) D.C. Brookins, pp. 263–289, Theophrestus Publications, S. A. Athens (1987)).

Shown below are several examples of the present invention that verify the following two important facts about the plutonium fuel compound of the present invention: it contains two phases, a plutonium host phase (with a fluorite type structure) and an alumina phase, in equilibrium; when spent, it contains four phases in equilibrium, which are primarily a plutonium host phase (with a fluorite type structure), a magnetoplumbite type phase, an alloy phase and an alumina phase. Further, the compositional range of the plutonium fuel compound of the present invention was determined on the basis of the results obtained in the examples.

Example 1: Experiment to Verify the Availability of Plutonium Fuel Compound System Consisting of Plutonium Dioxide, Thoria and Alumina The following three samples were prepared and the availability of the fuel compound system mentioned above was reviewed.

Sample 1—1: Plutonium-free sample

Solutions of thorium and aluminum, as rendered acidic with nitric acid, were mixed at mol % ratios of 47.4:52.6 (thoria/alumina) and evaporated to dryness. The dried product was heated at 800° C. in air atmosphere to form a mixture of oxides. In accordance with the current practice of nuclear fuel fabrication, the mixture of oxides was shaped into pellets each having an outside diameter of 7 mm and weighing about 500 mg; the pellets were sintered by heating at 1,500° C. for 4 h in a hydrogen ($H_2$) stream. The sinter was then ground into a powder, which was subjected to X-ray diffraction for identifying the produced phases.

The X-ray diffraction scan showed that the reaction product contained two phases in equilibrium, which were a thoria phase, or a plutonium host phase (with a fluorite type structure) having a lattice constant of 5.596Å and an alumina phase.

Sample 1-2: Plutonium-containing sample

Solutions of plutonium, thorium and aluminum, as rendered acidic with nitric acid, were mixed at mol % ratios of 5:45:50 (plutonium dioxide/thoria/alumina) and evaporated to dryness. The dried product was heated at 800° C. in air atmosphere to form an oxide. In accordance with the current practice of nuclear fuel fabrication, the oxide was shaped into pellets each having an outside diameter of 7 mm and weighing about 500 mg; the pellets were sintered by heating at 1,500° C. for 4 h in a hydrogen ($H_2$) stream. The sinter was ground into particles, which were subjected to X-ray diffraction for identifying the produced phases.

The X-ray diffraction scan showed that the reaction product contained two phases at equilibrium, which were a plutonium host phase (with a fluorite type structure) having a lattice constant of 5.575Å and an alumina phase.

Sample 1-3: Sample containing simulated fission products

Solutions of simulated fission products (see Table 1), thorium and aluminum, as rendered acidic with nitric acid, were mixed at mol % ratios of 5:45:50 (simulated fission products/thoria/alumina) and evaporated to dryness. The quantities of the simulated fission products are equivalent to the fission of all plutonium in sample 1-2. In other words, one gram of fission products is equivalent to the fission of one gram of plutonium. The respective simulated fission products and their relative quantities are shown in Table 1. With a view to promoting the reaction of alumina with certain fission products (i.e., alkali metal elements and alkaline earth metal elements), alumina was added in an amount about 5 times as many as the valve required to form magnetoplumbite. The dried product was calcined by heating at 500° C. in a stream consisting of a mixture of 4% hydrogen ($H_2$) and 96% helium (He). The calcine was shaped into pellets each having an outside diameter of 7 mm and weighing about 500 mg; the pellets were sintered by heating at 1,500° C. for 4 h in a stream consisting of 504 carbon dioxide ($CO_2$) and 50% carbon monoxide (CO). The mixed stream was employed to simulate the oxygen potential in nuclear fuels (ca. −300 kJ/mol $O_2$). The sinter was ground into particles and subjected to X-ray diffraction for identifying the constitutional phases.

The X-ray diffraction scan showed that the reaction product contained four phases, a plutonium host phase (with a fluorite type structure), a magnetoplumbite phase, an alloy phase and an alumina phase, at equilibrium.

TABLE 1

| Simulated Plutonium Fission Products (from Fast Reactor) | | | |
|---|---|---|---|
| Element | g·atom % | wt. % | substituting for |
| 1. Zr (zirconium) | 11.31 | 9.02 | none |
| 2. Ce (cerium) | 13.74 | 16.83 | part of La and Pr |
| 3. Nd (neodymium) | 13.86 | 17.50 | part of Pm, Sm, Eu, Gd and Y |
| 4. Cs (cesium) | 13.07 | 15.21 | part of Rb |
| 5. Sr (strontium) | 6.26 | 4.80 | part of Ba |
| 6. Mo (molybdenum) | 16.38 | 13.76 | part of Tc |
| 7. Ru (rubidium) | 13.20 | 11.68 | none |
| 8. Rh (ruthenium) | 3.65 | 3.28 | none |
| 9. Pd (palladium) | 8.49 | 7.90 | none |

Summary of Example 1

The lattice constant of the plutonium host phase (with a fluorite type structure) decreased from 5.596Å in sample 1—1 to 5.575Å in sample 1-2 and this is evidence for the dissolution of plutonium in the plutonium host phase. The experiment on sample 1-3 verified that the spent fuel had four phases at equilibrium as designed for high-level radioactive wastes.

Thus, the availability of a plutonium fuel compound was verified that consisted of plutonium dioxide, thoria and alumina in mol % ratios of 5:45:50 and which contained two phases, plutonium host phase (with a fluorite type structure) and alumina phase, at equilibrium.

Example 2: Experiment to Verify the Availability of Plutonium Fuel Compound System consisting of Plutonium Dioxide, Stabilized Zirconia and Alumina The following three samples were prepared and availability of the fuel compound system mentioned above was reviewed as in Example 1.

Sample 2-1: Plutonium-free sample

A solution of 11 mol % gadolinia ($Gd_2O_3$) and 89 mol % zirconia ($ZrO_2$) was rendered acidic with nitric acid for use as an acidic solution of stabilized zirconia. This solution and an aluminum solution as rendered acidic with nitric acid were mixed in mol % ratios of 47.4:52.6 (stabilized zirconia/ alumina) and evaporated to dryness. The dried product was heated at 800° C. in air atmosphere to form an oxide. Simulating the current practice of nuclear fuel fabrication, the oxide was shaped into pellets each having an outside diameter of 7 mm and weighing about 500 mg; the pellets were sintered by heating at 1,500° C. for 4 h in a hydrogen stream. The sinter was ground into particles and subjected to X-ray diffraction for identifying the produced phases.

The X-ray diffraction scan showed that the reaction product contained two phases at equilibrium, which were a plutonium host phase (with a fluorite type structure) laving a lattice constant of 5.162Å and an alumina phase.

Sample 2—2: Plutonium-containing sample

Solutions of plutonium, stabilized zirconia and aluminum, as rendered acidic with nitric acid, were mixed at mol % ratios of 5:45:50 (plutonium dioxide/stabilized zirconia/ alumina) and evaporated to dryness. The dried product was heated at 800° C. in air atmosphere to form an oxide. Simulating the current practice of nuclear fuel fabrication, the oxide was shaped into pellets each having an outside diameter of 7 mm and weighing about 500 mg; the pellets were sintered by heating at 1,500° C. for 4 h in a hydrogen stream. The sinter was ground into a powder, which was subjected to X-ray diffraction.

The X-ray diffraction scan showed that the reaction product contained two phases in equilibrium, which were a plutonium host phase (with a fluorite type structure) having a lattice constant of 5.186Å and an alumina phase.

Sample 2-3: Sample containing simulated fission products

As in the case of the preparation of sample 1-3, solutions of simulated fission products, stabilized zirconia and aluminum, as rendered acidic with nitric acid, were mixed at mol % ratios of 5:45:50 (simulated fission products/stabilized zirconia/alumina) and evaporated to dryness. The dried product was calcined by heating at 500° C. in a stream consisting of a mixture of 4% hydrogen and 96% helium. The calcine was shaped into pellets each having an outside diameter of 7 mm and weighing 500 mg; the pellets were sintered by heating at 1,500° C. for 4 h in a stream consisting of a mixture of 50% carbon dioxide and 50% carbon monoxide. The sinter was ground into a powder and subjected to X-ray diffraction for identifying the constitutional phases.

The X-ray diffraction scan showed that the reaction product contained four phases in equilibrium, which were a plutonium host phase (with a fluorite structure), a magnetoplumbite type phase an alloy phase and an alumina phase.

Summary of Example 2

The lattice constant of the plutonium host phase (with a fluorite type structure) increased from 5.162Å in sample 2-1 to 5.186Å in sample 2—2 and this is evidence for the dissolution of plutonium in the plutonium host phase. The experiment on sample 2-3 verified that the spent fuel had four phases at equilibrium as designed for high-level radioactive wastes.

Thus, the availability of a plutonium fuel compound was verified that consisted of plutonium dioxide, stabilized zirconia and alumina at mol % ratios of 5:45:50 and which contained two phases, plutonium host phase (with a fluorite type structure) and alumina phase, in equilibrium.

The compositional Range of the Plutonium Fuel Compound

The compositional range in which the plutonium fuel compound of the present invention was available was determined from the following parameters: (1) the equilibria of a three-component system consisting of plutonium dioxide, plutonium host phase and alumina; (2) the compositional range as determined from the alumina content; (3) the compositional range as determined from the amount of plutonium dissolved in the plutonium host phase; and (4) the compositional range as determined from the density of plutonium in the fuel.

(1) Equilibria of a three-component system consisting of plutonium dioxide, plutonium host phase and alumina FIG. 1 is a phase diagram showing the equilibria of a three-component system, consisting of plutonium dioxide, plutonium host phase and alumina, at 1,900° C. and below as constructed on the basis of the results obtained in Examples 1 and 2. Component A is the plutonium host phase which is composed of either thoria or stabilized zirconia; component B is plutonium dioxide; and component C is alumina. The thick line AB designates the solid solution of plutonium dioxide in the plutonium host phase.

Point P on line AC refers to the composition of samples 1—1 and 2-1, each consisting of 47.4 mol % plutonium dioxide and 52.6 mol % alumina, and point Q within the diagram refers to the composition of samples 1-2 and 2—2, each consisting of 5 mol % plutonium dioxide, 45 mol % plutonium host phase and 50 mol % alumina. Point Q also refers to the composition of spent fuel samples 1-3 and 2-3. The phase equilibria of those samples showed that the compound within the triangle ABC contained two phases in equilibrium, which were the plutonium host phase having plutonium dioxide dissolved therein and alumina.

(2) Compositional range as determined from the alumina content (2)—a: the chemical equivalent amounts of alumina that were necessary to form magnetoplumbite type phases from alkali metal elements and alkaline earth metal elements as fission products were calculated from chemical formulae and indicated by line AI in the diagram. Point I refers to 67 mol % alumina and 33 mol % plutonium dioxide. Hence, the area within the triangle AIC designates a maximum compositional range over which the plutonium fuel compound of the present invention is available.

(2)—b: It was verified from samples 1-(2) and 1-(3), as well as from samples 2-(2) and 2-(3)that when alumina was added in amount five times as many as the value necessary to generate magnetoplumbite type phases from alkali metal elements and alkaline earth metal elements as fission products, phase equilibria could be attained rapidly. Line AV plots the values of alumina content that were five times as many as the value necessary to produce the magnetoplumbite type phases. Point V refers to 91 mol % alumina and 9 mol % plutonium dioxide.

Thus, the examples verified the availability of the intended plutonium Fuel compound at a composition within the triangle AVC. Note that point P and Q lie on sides of the triangle AVC.

(3) Compositional range as determined from the amount of plutonium dissolved in the plutonium lost phase The two-phase equilibrium verified by samples 1—1 and 2-1 at point P shows that line AC is a conjugation line for the plutonium host phase and alumina. The two-phase equilibrium verified by samples 1-2 and 2—2 at point Q shows that line XC is a conjugation line for the plutonium host phase (having 10 mol % plutonium dioxide dissolved) and alumina point X refers to 10 mol % plutonium dioxide and 90 mol % plutonium host phase. Thus, the availability of the intended plutonium fuel compound was verified. Further, samples 1–3 and 2–3 showed that when spent, samples 1-2 and 2—2 at point Q were already the as-designed high-level waste.

It thus became clear that the desired plutonium fuel compound was available at a composition within the triangle AXC. Note that points P and Q lie on sides of the triangle AXC.

(4) Compositional range as determined from the density of plutonium in the fuel

As already mentioned in connection with the description of the prior art, the burnup of light-water reactor fuels is 3–5%. Line DE in the FIG. 1 diagram designates 5 mol % plutonium dioxide and line FG refers to 3 mol % plutonium dioxide.

Thus, it became clear that the plutonium fuel compound of the present invention was available with the compositional range within the trapezoid DEFG. Note that point Q also lies on a side of the trapezoid DEFG.

Combining the four compositional ranges discussed above, one can determine the range in which the plutonium fuel compound of the present invention can actually be obtained and that is the area bounded by triangle aQb, in which point a is at the intersection between lines AV and FG and point b is at the intersection between lines XC and FG. Point a refers to the composition consisting of 3 mol % plutonium dioxide, 67 mol % plutonium host phase, and 30 mol % alumina; point Q refers to the composition consisting of 5 mol % plutonium dioxide, 45 mol % plutonium host phase, and 50 mol % alumina; and point b refers to the composition consisting of 3 mol % plutonium dioxide, 27 mol % plutonium host phase, and 70 mol % alumina.

Composition of Stabilized Zirconia

The stabilized zirconia used in Example 2 consisted of 11 mol % $Gd_2O_3$ and 89 mol % $ZrO_2$ but it should be apparent to one skilled in the art that the stable zirconia phase can exist over the compositional range of 8–53 mol % $Gd_2O_3$ and 92-47 mol % $ZrO_2$.

The present invention provides a once-through plutonium fuel compound having its composition and phase structure adjusted in the manner recited in the appended claims. The fuel compound offers the following benefits.

(1) It can be manufactured by the conventional fuel fabrication technology and can be used together with currently used nuclear fuels in currently operating light-water reactors or fast reactors.

(2) Nuclear fuels comprising the compound under consideration can be burned almost completely by designing an appropriate layout within reactor and, hence, there is no need to reprocess spent fuels.

(3) The fuel compound is so adjusted in composition and phase structure that, when spent, it requires no special chemical treatment or solidification treatment to be converted to a stable high-level radioactive waste.

(4) As will be apparent to one skilled in the art, the fuel compound can also be used in fuels that substitutes enriched uranium or transuranic elements (neptunium, americium, etc.) for plutonium.

What is claimed is:

1. A plutonium fuel composition having a composition range defined by the lines that connect the three compositional points of a three-component system consisting essentially of plutonium dioxide, a plutonium host phase and alumina; said composition having such a phase structure that two phases, said plutonium host phase having plutonium dioxide dissolved therein and said alumina phase, are in equilibrium;

wherein said three compositional points are the point for 3 mol % plutonium oxide, 67 mol % plutonium host phase and 30 mol % alumina; the point for 5 mol % plutonium oxide, 45 mol % plutonium host phase and 50 mol % alumina; and the point for 3 mol % plutonium oxide, 27 mol % plutonium host phase and 70 mol % alumina; and wherein said plutonium host phase is either thoria having a fluorite-type structure or stabilized zirconia having a fluorite-type structure and consisting essentially of 8–53 mol % $Gd_2O_3$ and 92-47 mol % of $ZrO_2$.

* * * * *